No. 692,738. Patented Feb. 4, 1902.
A. L. TOWNE & E. F. CLOUGH.
ACETYLENE GAS GENERATOR.
(Application filed Apr. 15, 1901.)
(No Model.)
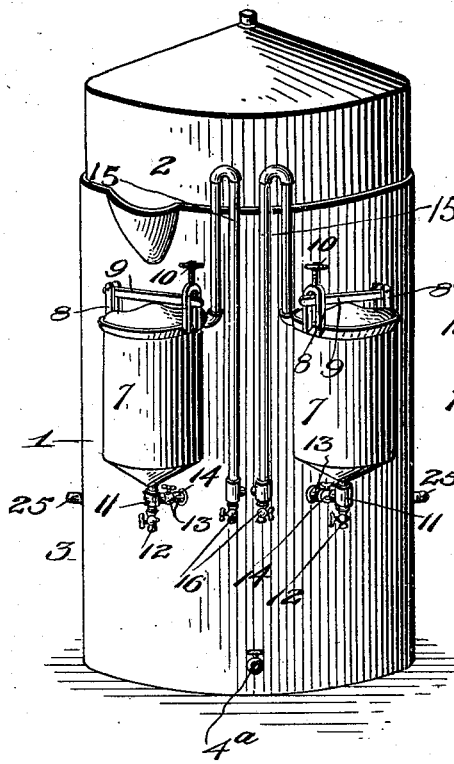
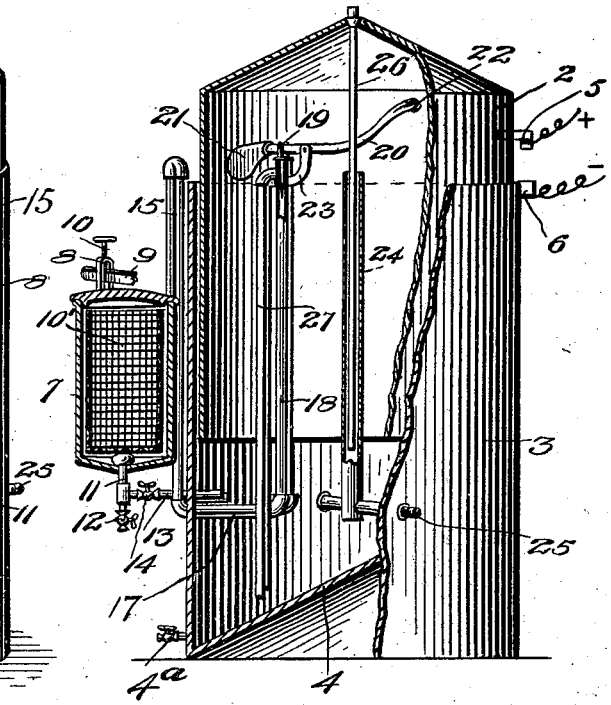
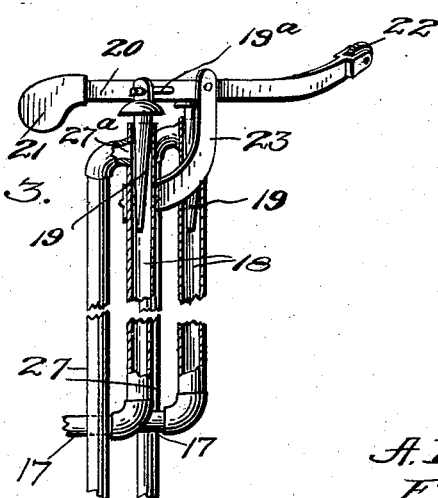

UNITED STATES PATENT OFFICE.

ALBERT LEE TOWNE AND EDGAR F. CLOUGH, OF FRESNO, CALIFORNIA.

ACETYLENE-GAS GENERATOR.

SPECIFICATION forming part of Letters Patent No. 692,738, dated February 4, 1902.

Application filed April 15, 1901. Serial No. 55,882. (No model.)

*To all whom it may concern:*

Be it known that we, ALBERT LEE TOWNE and EDGAR F. CLOUGH, citizens of the United States, residing at Fresno, in the county of Fresno and State of California, have invented certain new and useful Improvements in Acetylene-Gas Generators; and we do declare the following to be a full, clear, and exact description of the invention, such as will enable others skilled in the art to which it appertains to make and use the same.

This invention relates to improvements in acetylene-gas generators, and aims to provide an apparatus which is simple in construction and efficient and safe in operation.

The invention consists of certain improved features of construction, combination, and arrangement of parts, as will be hereinafter more fully described, and particularly pointed out in the appended claim.

In the accompanying drawings, Figure 1 is a perspective view of an acetylene-gas apparatus constructed in accordance with our invention. Fig. 2 is a partial sectional and partial side elevational view of the same on the central line of one of the generators, and Fig. 3 is a perspective view of the gas-pipes and automatic valve mechanism.

Referring now more particularly to the drawings, the numeral 1 represents the gasometer, the bell 2 of which is mounted, as usual, to move vertically within the tank 3 and rises and falls according to the pressure of the gas. The escape of gas from the gasometer is prevented by the water arranged in the tank 3, into which the lower end of the body portion of the bell 2 dips. The tank 3 is provided with an inclined bottom 4 and with a draw-off cock 4ª, located above the lower end of said inclined bottom, whereby the water contained within the tank may be drawn off whenever desired.

5 and 6 represent the contacting parts of an electric or any other kind of signal, which is operated to sound an alarm when the gas-generators are exhausted by the falling of the bell 2 in the manner hereinafter described.

The gas-generators 7, two in number, are arranged upon the exterior of the tank 3, and each is closed at the top by a cover 8, which is clamped in position by a pivoted lever or holding-bar 9 and a clamping-screw 10, acting thereon. Each generator contains a perforated basket 10' for the reception of the carbid and at its lower end is provided with a pipe 11, having a cock 12 for drawing off the residuum. Above the cock 12 a water-supply pipe 13 is connected to the pipe 11 and leads thereto from the interior of the tank to supply water to the generator, and in this pipe 13 there is a valve 14 for regulating the feed of water to the generator. From the top of each generator leads a pipe 15, which extends downward and enters the tank 3 at a point below the generator, and at its lower end said pipe is provided with a drip-cock 16, which may be opened to allow any water which may have been carried out with the gas and deposited in the pipe to exhaust. A union-pipe 17 connects the pipe 15 with a vertically-arranged pipe 18, which extends upwardly above the level of the water in the tank 3 and discharges the gas into the upper portion of the bell 2. The supply of gas from each generator to the bell is controlled by a tapered plunger-valve 19, which governs a port formed by the opening in the upper end of said pipe 18 and is mounted upon one arm of an intermediately-pivoted lever 20, which is provided at one end with a counterbalancing-weight 21, which normally holds the said valve 19 closed, and at its other end with a friction-roller 22, which bears against the inner surface of the wall of the bell 2. The two valves 19 are pivotally connected to the lever, preferably being mounted upon a common pivot-pin 19ª, passed through said lever, so that said valves may slide vertically within the pipes 18 without interfering with the free arcuate swing of the lever. The lever 20 is pivotally mounted upon the bracket 23, and in the operation of the apparatus as the bell rises under the pressure of the gas flowing therein the lever is held stationary until the bell rises to a predetermined height, when the friction-roller is released and the counterbalancing-weight 21 draws the other end of the lever downward, and thereby closes the valve 19 and shuts off the flow of gas from the generator to the bell. The pressure of the gas in the generator then forces the water back through the pipes 11 and 13 and prevents the further generation of gas. The gas within the gasometer passes out for use through an outlet-pipe 24, which connects at its lower end with a pipe 25, to which the service-pipe of the house or building to be supplied with gas is coupled. A rod 26 telescopes within the outlet-pipe 24 and is connected at its upper end to the bell 2 and serves as a guide therefor to insure a proper vertical movement thereof.

The gas-pipes 15 of the two generators 7 connect with similar pipes 18 on the interior of the gasometer 1 and are simultaneously controlled to regulate the passage of gas therethrough by the two valves 19, mounted upon the lever 20.

To insure safety in the operation of the apparatus in the event that the valve 14 in the water-pipe 13 of the operating-generator should be closed by accident or mistake while the flow of gas through the pipe 18 to the bell is being prevented by the valves 19, we provide safety-pipes 27, one for each generator, which are coupled at their upper ends to the pipes 18 and are open at their lower ends and submerged in the water in the tank 3. Each pipe 27 communicates by a port or passage formed by the coupling 27<sup>a</sup> with the interior of the pipe 18, adjacent to the upper end thereof, said port being always open and uncontrolled by the valve 19, as the tapered formation of the latter provides a space or passage between the valve and wall of the pipe 18, through which gas may flow to the port 27<sup>a</sup> and thence into the pipe 27 when the said valve 19 is closed to prevent the direct discharge of the gas through the upper end of the pipe 18 into the bell of the gasometer. When the gasometer is full of gas and has risen to the limit of its upward movement and the valves 19 have closed to cut off the flow of gas into the gasometer from the pipes 18, the pressure of the gas in the working generator 7 normally forces the water contained therein back through the pipes 11 and 13 into the tank 3; but if this should be prevented by the closing of the valve 14 and generation continues the pipe 27, which is in open communication with the upper end of the pipe 18, will permit the generation of gas in the generator to a point where the pressure of said gas is equal to the pressure of the head on the column of water in the tank 1, all surplus gas escaping into the tank through said pipe 27, whereby safety is insured. Upon the opening of the valve 14 the gas within the generators 7 will again force the water back into the tank through the pipes 11 and 13 and arrest the generation of gas. The two generators are operated separately, and when one is exhausted the other, which is filled, is set into operation.

The operation is as follows: Water is first placed in the tank to the level indicated and a suitable charge of calcium carbid placed in the basket 10 of each receptacle, the valves 14 controlling the supply of water to the receptacles having been previously closed. The valve 14, controlling the supply of water to the generator which is to be used, is then opened and the water admitted starts the generation of gas, and when the bell has been elevated to a predetermined height the lever 20 is released and the valve 19 is drawn down by the counterbalancing-weight 21 and caused to close the pipe 18 and cut off the further entrance of gas into the bell. The generation of gas within the generator then continues until the pressure therein is sufficient to overcome the pressure of the water in the pipes 11 and 13, when it forces the water in said pipes downward and back into the tank 3, and thereby arrests the generation of gas. As the bell 2 rises and falls, according to the degree of pressure therein, the lever 20 is operated to open the valve 19 to start the generation of gas or to close said valve to stop the generation of gas. When the charge of carbid in the generator in use has been exhausted, the bell 2 descends, and when it reaches a predetermined point the contact-piece 5 thereon engages the alarm device 6 on the tank 3, and thus sounds an alarm, indicating to the attendant that the charge of carbid in the working generator has been exhausted. The attendant then closes the valve 14 of the exhausted generator and opens the corresponding valve of the other generator, and the generation of gas again commences, the two generators being used in alternation in this manner in order to secure a continuous generation of gas. It will be seen that the valves in the two conducting-pipes 18 are operated by a common lever 20, which insures a uniform operation of the apparatus at all times, no matter which generator is employed, and at the same time materially simplifies the construction and reduces the number of parts to the minimum.

From the foregoing description, taken in connection with the accompanying drawings, the construction and mode of operation of the invention will be readily understood, and it will be seen that it provides an apparatus which embodies desirable advantages in point of simplicity of construction, uniform action of the parts, and safety in operation.

While the preferred embodiment of the invention is as herein disclosed, changes in the form, proportion, and minor details of construction may be made within the scope of the invention without departing from the spirit or sacrificing any of the advantages thereof.

Having thus fully described our invention, what we claim as new, and desire to secure by Letters Patent, is—

In an acetylene-gas apparatus, the combination of a gasometer, a generating-chamber supported upon the exterior of the water-tank of the gasometer, a combined valved water-inlet and drain-pipe connected to the bottom of the generator, a valved water-supply pipe communicating between said inlet and drain pipe and the interior of the water-tank of the gasometer, a gas-discharge pipe leading from the top of the generator and extending downward and thence projecting into the tank, a conducting-pipe communicating with said discharge-pipe and extending upward therefrom into the bell, a tapered plunger-valve sliding in the upper open end of the conductor-pipe and controlling the flow of gas therefrom to the bell, a safety-pipe having an always open port communicating with the conducting-pipe adjacent to the upper end thereof and extending downward therefrom and submerged in the water of the tank, a bracket supported by one of said pipes within the tank, a lever pivoted intermediately to said bracket and counterweighted at one end and contacting at its other end with the bell to be operated thereby, the said plunger-valve being pivoted to the weighted end of said lever, substantially as described.

In testimony whereof we have hereunto set our hands in presence of two subscribing witnesses.

ALBERT LEE TOWNE.
EDGAR F. CLOUGH.

Witnesses:
JOHN R. JONES,
JARVIS STREETER.